United States Patent Office 3,134,278
Patented May 26, 1964

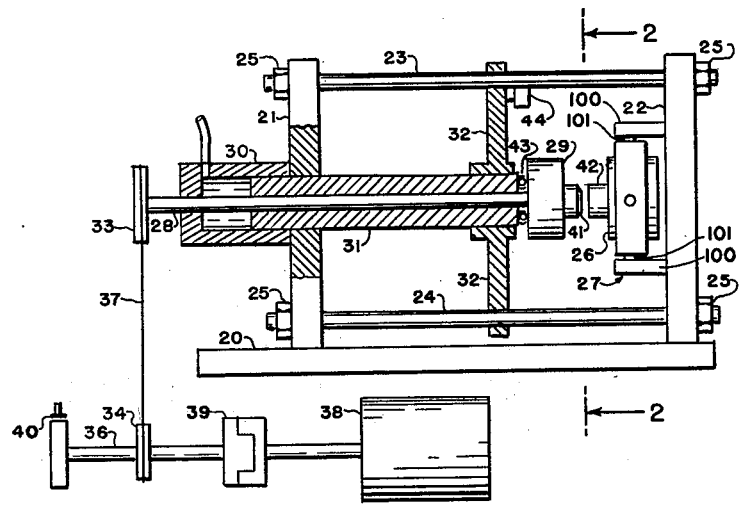

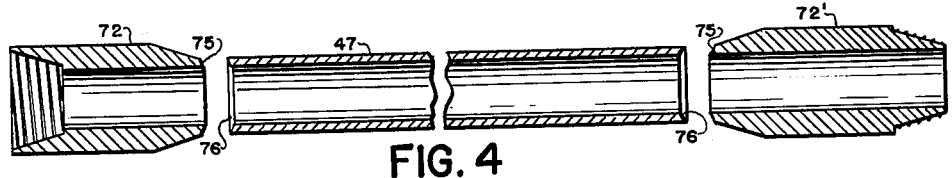
FIG. 4
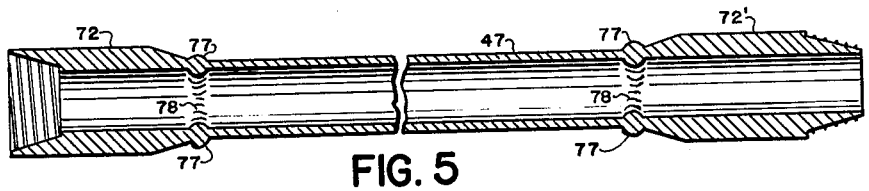
FIG. 5
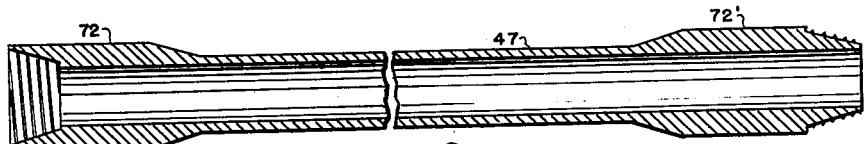
FIG. 6
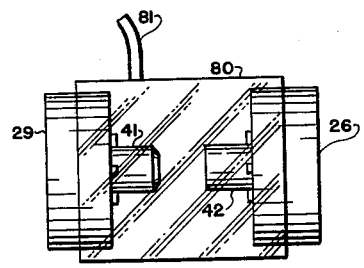
FIG. 7
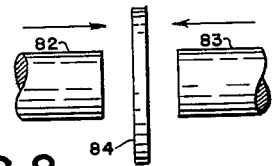
FIG. 8
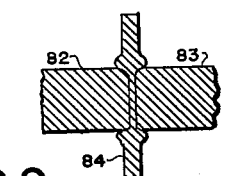
FIG. 9
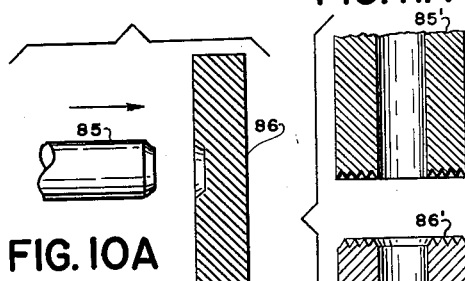
FIG. 10A
FIG. 10B
FIG. 11A
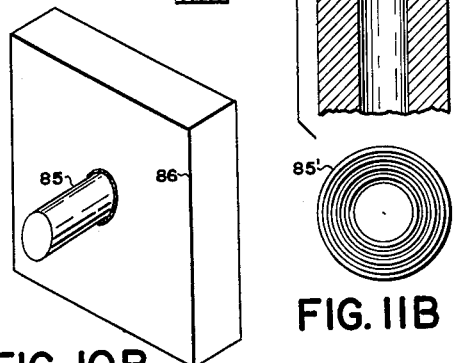
FIG. 11B May 26, 1964  M. B. HOLLANDER ETAL  3,134,278
FRICTION WELDING
Filed Aug. 12, 1959  3 Sheets-Sheet 3
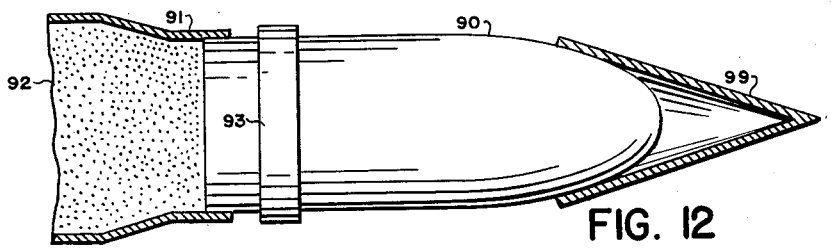
FIG. 12
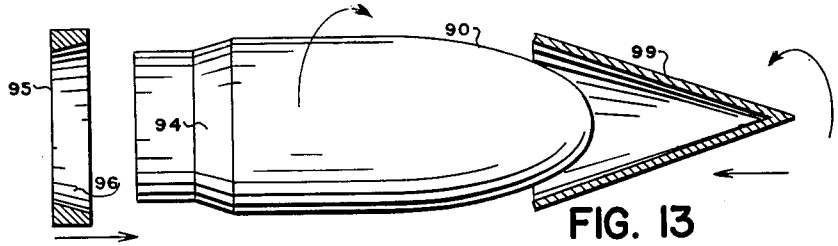
FIG. 13
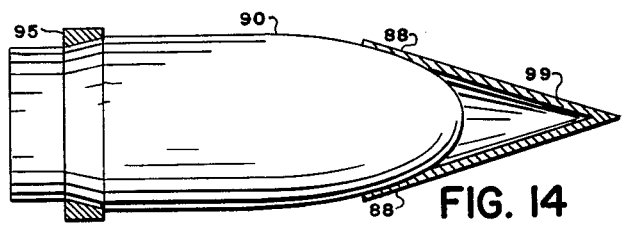
FIG. 14
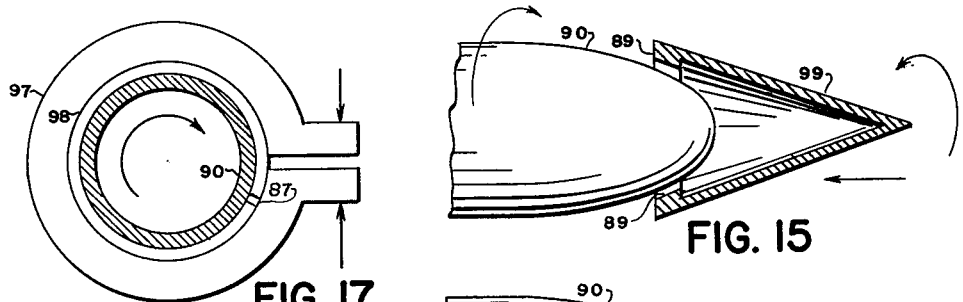
FIG. 15
FIG. 17
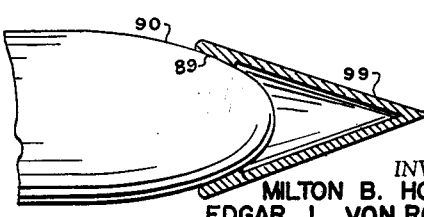
FIG. 16
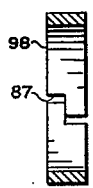
FIG. 18
INVENTORS:
MILTON B. HOLLANDER
EDGAR L. VON ROSENBERG
BY
William A. Drucker
ATTORNEY

3,134,278
FRICTION WELDING
Milton B. Hollander, Teaneck, N.J., and Edgar L. Von Rosenberg, Oklahoma City, Okla., assignors to American Machine & Foundry Company, a corporation of New Jersey
Filed Aug. 12, 1959, Ser. No. 833,339
4 Claims. (Cl. 78—82)

This invention relates to methods and apparatus for welding metal workpieces using heat generated by friction as the pieces to be welded are rubbed against each other. More particularly, this invention relates to the friction welding of metal workpieces by rotating one workpiece relative to the other while the workpieces are pressed together until sufficient heat is generated to effect a weld and thereafter stopping the relative rotation while the workpieces are continued to be pressed together until the weld is completed.

Conventional welding practice requires a separate source of heat to reduce the portions of the workpieces to be joined to a molten or plastic state. Sometimes additional filler metal is added to bond the welded pieces together or brazing is employed. The separate source of heat is commonly provided by an oxyacetylene flame, high frequency induction, an electric current passed through the pieces as in resistance welding, or by an electric arc. Although conventional methods produce firm welds for certain uses, this invention provides a superior weld for many specific applications.

Another form of metal working involves spinning a tool against a metal to be formed to generate heat either in the workpiece or in an adjacent solder material. The tool is then reused and does not fuse to the workpiece. Solder or welding stock may also be rotated to produce enough heat to flow the stock material into a joint between workpieces. In none of these methods is a metal workpiece rubbed against a piece to which it is to be fused.

Although spin welding is known in the art of working thermoplastic polymer resins, the treatment of metals presents complex problems which are not analogous to thermoplastic resins.

According to the present invention an apparatus is provided for friction welding metal workpieces which comprises in combination a frame and two chucks including preferably a stationary chuck fixed to the frame, which may also be described as an axially fixed workpiece chuck, and an axially movable workpiece chuck. The frame supports axial thrust. Means are provided to force the chucks together. Further means are provided to rotate at least one of the chucks rapidly as they are moved together. Stopping means are also provided for the chuck or chucks. The shaft of the movable chuck is rotatable and is slidable in one end member; the shaft of the stationary chuck is preferably rotatably mounted in the other end member.

The frame is provided with a pair of end members. The end members are connected by at least two parallel longitudinal frame members, such as rods, coplanar with the axes of the chucks. A yoke, or rigid transverse crosshead support, is slidably mounted on the longitudinal members to support the movable chuck.

The invention also includes self-aligning means to support the stationary chuck for welding workpieces having matching tapers.

A further feature of the invention is the use of a flywheel, or inertial mass, for storing energy over a period of time which is derived from a motor connected to at least one of the chucks through a clutch. A speed reducing means may be used in combination with the connection of the flywheel to the chuck through a clutch.

Another feature of the invention includes means for maintaining a controlled gaseous atmosphere surrounding at least part of the workpieces held in the chucks.

An object of this invention is to provide a method for welding metal workpieces having weld areas which may be developed by revolution.

Another object of this invention is to provide a method for more easily, cheaply, efficiently, securely and cleanly butt welding cylindrical or tubular metal workpieces.

Yet another object of this invention is to provide a means to weld dissimilar metals or alloys that are difficult or impossible to weld conventionally.

Still another object of this invention is to provide a method of welding metal workpieces by the generation of the smallest amount of heat in the shortest possible period of time to prevent excessive decarburization, deformation of the workpieces, or like undesirable effects in the area of the weld.

A further object of this invention is to provide a welding device which has a lower power requirement. The low power requirement is inherent in the friction welding process. Also, the maximum power demand can be reduced by storing rotational energy in a flywheel over a period of time until it is needed for the relatively short welding cycle.

A still further object of this invention is to provide a friction welding device which has a welding cycle controlled by any of the following means, singly or in combination: thermo-electric or infra-red signals from the area of the weld; relative movement towards each other of the workpieces after initial contact; or the torque exerted between the workpieces during the generation of heat and the formation of the weld.

Yet a further object of this invention is to provide interlocking tapers and/or teeth at the ends of workpieces to be friction welded so that chatter is reduced, the weld strength and zone area is increased and proper alignment is assured. The increase in weld zone area thereby obtained provides stronger joints even with less efficient welds.

An additional object of this invention is to provide a machine, for the friction butt welding of workpieces, which rotates the workpieces relative to each other, forces the workpieces together while rotating, holds them firmly to prevent any vibration or chatter, rapidly stops the relative rotation of the workpieces to complete the weld, applies a second higher pressure to squeeze excess melted metal from the weld zone, serves as a lathe to trim the ends of the workpieces to the proper shape and alignment before they are welded, and serves as a lathe to turn off excess upset metal after the weld is completed.

Another additional object of this invention is to provide a superior method to weld bands to generally cylindrical objects such as the rotating bands which are welded to military projectiles.

A further additional object of this invention is to provide a lighter, more rugged, and simpler welding apparatus which may be mounted on a vehicle to weld tool joints and similar couplings to oil well drill pipe in the field.

Still other objects, advantages, and features of invention which reside in the construction, arrangement and combination of parts involved in the invention and its practice will be understood from the following description and accompanying drawing wherein corresponding elements are designated by similar characters and in which:

FIG. 1 is a side view, partly broken away in section, of an apparatus for friction welding;

FIG. 2 is a section taken on line 2—2 of FIG. 1;

FIG. 3 is a side view, partly broken away in section, of the friction welding apparatus modified and adapted for welding tool joints to drill pipe;

FIG. 4, FIG. 5 and FIG. 6 are longitudinal sections through a length of drill pipe with tool joints shown in position before welding, after welding, and after the upset it machined off;

FIG. 7 shows a cover providing a controlled atmosphere in the area of a weld;

FIG. 8 shows a third intermediate piece positioned between two workpieces to be friction welded;

FIG. 9 is a longitudinal section showing the third intermediate piece bonding the two work pieces after friction welding;

FIG. 10A shows a cylindrical workpiece in position to be friction welded to a non-cylindrical workpiece shown in section;

FIG. 10B is a perspective view showing the cylindrical workpiece of FIG. 10A friction welded to the non-cylindrical workpiece;

FIG. 11A is a longitudinally cross sectional view of two workpieces of tubing positioned for friction welding and showing multiple interlocking saw tooth ridges on the abutting surfaces thereof;

FIG. 11B is an end view of one of the workpieces of FIG. 11A;

FIG. 12 is a side view of a conventional round of ammunition or projectile with the casing and the windshield shown in section;

FIG. 13 is a side view of a projectile similar to that shown in FIG. 12, but slightly modified so as to have both a rotating band and a windshield, friction welded to it with the rotating band and the windshield shown in longitudinal section in position to be welded;

FIG. 14 is a side view of the projectile shown in FIG. 13 with the rotating band and the windshield shown in longitudinal section friction welded to it;

FIG. 15 is a side view of a fragment of a front portion of another projectile with a specially modified windshield shown in longitudinal section in position to be friction welded to it;

FIG. 16 is a side view of the fragment of the front portion of the projectile shown in FIG. 15 with the modified windshield shown in longitudinal section friction welded to it;

FIG. 17 is a front view of a split clamp holding a split ring rotating band against a projectile shown in section for friction welding; and FIG. 18 is a longitudinal section through the split ring rotating band of FIG. 17 especially adapted for friction welding.

Referring to the drawing in detail, FIGS. 1 and 2 show a basic friction welding apparatus as a preferred form of the invention. On the base 20 there are fixed a first vertical frame member 21 and a second vertical frame member 22. These are connected top and bottom by heavy horizontal frame members 23 and 24. The horizontal frame members 23 and 24 are shown as heavy rods secured by nuts 25. However, any suitable frame structure which is preferably rectangular could be used. Within the second vertical frame member 22 there is fixed a workpiece holding chuck 26 by a suitable self-aligning support mechanism 27. This support mechanism includes a pair of horizontal brackets 100 in which are pivoted trunnions 101 extending from chuck 26. Extending through the first vertical frame member 21 is the spindle 28 with a workpiece holding chuck 29 fixed to its innermost end to rotate with it. A hydraulic cylinder 30 has a heavy duty plunger 31 working within it. This plunger 31 is supported at its inwardly disposed end by a yoke 32 which is slidably secured by the horizontal frame members 23 and 24. Since the spindle 28 is rotatably journaled within the plunger 31, the yoke 32 gives maximum support to the chuck 29 to prevent any unwanted vibration as it is rotated. A set of pulleys 33 and 34, mounted respectively on the spindle 28 and on a drive shaft 36, are connected by suitable belting 37 or by other transmission means. A high speed motor 38 drives the shaft 36 through a clutch 39. A brake 40 is mounted on the drive shaft 36 to stop rapidly both it and the spindle 28 which carries the chuck 29.

In the operation of this apparatus workpieces 41 and 42 are secured respectively in the stationary chuck 26 and the driven chuck 29. If the workpieces to be welded have square ends, the stationary chuck 26 would not be self-aligning, but it would be rigidly fixed to the second vertical frame member 22. If the workpieces have suitable end forms, as will be later described, the chuck 26 may be self-aligning, as shown. The clutch 39 is engaged and the workpiece 41 is rapidly rotated. Hydraulic fluid is forced into the cylinder 30 to move the plunger 31 outward and bring the workpieces together. Heavy duty thrust bearings 43 take the load from the chuck 29. As soon as the proper conditions are reached at the contact surface between the workpieces, the clutch 39 is disengaged and the brake 40 is applied. In a test machine, a magnetic clutch 39 was used with an electric brake 40 as these were easily controlled to provide an automatic welding cycle.

To weld two pieces of metal according to this invention, several conditions are of great importance. The surfaces to be welded should be accurately aligned before and during the welding process to maintain uniform contact pressure over the entire area to be welded. The workpieces should be rigidly held in position so that they cannot vibrate or chatter during the welding. The relative sliding speed at the weld surface should be at least 50 feet per second for most steels. The angular velocity then depends on the size of the workpieces and the characteristics of the metal being welded. For example, a one-inch diameter AISI 4140 steel workpiece requires a rotational speed of about 5,000 r.p.m. The contact pressure at the weld area should be between about 1,000 to 10,000 p.s.i. depending on the size and character of the metal being welded and the dimensions of the section. A one inch AISI 4140 steel workpiece requires about 3000 p.s.i. contact pressure. Under these conditions, a thin molten film about 0.005 inch thick is formed at the area of contact. This is sufficient to fuse the metal and form a weld bonding the workpieces. Rotation must be stopped after the molten film has formed and the upset or plastic flow of metal has reached a prescribed amount. If this rotation is not stopped within a time which depends on the material being welded and the shape of the weld surface, the weld will be broken. The apparatus, which has been described, meets these requirements and produces firm welds.

FIG. 3 shows a modification of the basic friction welder of FIG. 1 which is set up to weld tool joints or couplings on drill pipe or drill collars and is another example of the invention. In place of a stationary chuck fixed to frame member 22, a rotary chuck 45 is fixed to a hollow shaft 46 which may accommodate a length of drill pipe 47 within it. The drill pipe 47 is gripped by the chuck 45 and may be rotated by a first motor 48 which drives the first shaft 46 by means of pulleys 49 and 50 and a belt 51. A suitable first clutch 52 divides the first shaft 46 which also has a first brake 53 fixed to it. On ways 54, which may be similar to those of a lathe bed and which may be built to swing into and out of position, there is mounted a tool holder 55 on the saddle 56. A low speed second motor 57 may drive the spindle 58 through the pulleys 59 and 60 and the second clutch 61. A high speed third motor 62 may turn the second shaft 63 through the pulleys 64 and 65 which step up the speed of the second shaft 63 from that of the third motor 62. A flywheel 66 of considerable mass is mounted on the second shaft 63. A third clutch 67 allows the second shaft 63 to drive the speed reducing pulleys 68 and 69 so that the spindle 58 turns at a lower rate of speed than the flywheel 66. A second brake 70 is mounted on the second shaft 63 beyond the pulley 68 to stop the spindle 58.

In the operation of this embodiment of the invention a piece of drill pipe 47 which is also equivalent to a drill collar is fixed in the chuck 45 within the first shaft 46. The length of the drill pipe 47, which extends far beyond the shaft 46, may be held for rotation by enough supports 71 to prevent the drill pipe 47 from whipping as it turns. A tool joint 72 is placed in the chuck 29. If the clutches 52 and 61 are engaged, the first and second motors 48 and 57 can rotate the tool joint 72 and the drill pipe 47 at a slow speed, for example about 100 r.p.m. This allows the tool holder 55 to be run in with the hand wheel 73 to face off both the drill pipe 47 and the tool joint 72. This ensures matching and alignment of these turned off faces when they are thereafter brought together for friction welding.

If the first and second clutches 52 and 61 are then disengaged, the drill pipe 47 may be held static and locked with the brake 53. If the third motor 62 is allowed to run for a short time, it can store considerable energy in the flywheel 66. Through the third clutch 67, this motor will also rapidly rotate the spindle 58. By activating the hydraulic cylinder 30, the rapidly rotating tool joint 72 is forced against the stationary drill pipe 47 with the thrust bearings 43 and 74 taking up the force. When the proper conditions have been reached, the weld can be completed as the third clutch 67 is disengaged and the second brake 70 is applied to stop the relative rotation of the tool joint and the drill pipe. Higher pressure must be applied and maintained by the hydraulic cylinder 30 to force excess melted metal out of the weld zone just after the brake is applied.

It has been found that the actual power required while making such a weld will be about 10 horsepower per square inch of weld surface. Since this power is only needed for 20 or 30 seconds, and several minutes may be required between welds to chuck up new workpieces, a lower horsepower third motor 62 may be used if it stores energy for the period of dead time in a flywheel. If a 200 h.p. motor would be needed to weld a 20 square inch joint on a drill pipe, a suitable flywheel can easily reduce this power requirement to a 50 h.p. motor with the great resulting saving in motor weight. This is an important consideration in a mobile unit for use in the field. During the actual weld cycle, the maximum speed of the flywheel and the spindle can fall off up to 20 percent as the welding takes energy from the flywheel, but the initial speed must be high enough to allow for this reduction. Although a smaller flywheel may be used to store the required amount of energy if it is turned faster than the spindle as shown in FIG. 3, a larger flywheel could be mounted directly on the spindle on non-mobile machines.

As shown in FIG. 4, the tool joints 72 and 72' and the corresponding ends of the drill pipe 47 may be prepared with the matching tapers 75 and 76 by turning them in the welding apparatus in the manner that has been described. These tapers have been found to reduce chatter and vibration during the actual welding operation. They also provide a greater welding surface and a stronger weld. This feature of the invention is illustrated in FIG. 11A and FIG. 11B. As the weld is completed as shown in FIG. 5, a certain amount of metal 77 and 78 upsets or flows plasticly. This upset may appear to be different in size and shape from that shown in the drawing. The chuck 29 may then be disengaged and withdrawn and the tool holder 55 may be used with suitable cutting tools, boring bars or grinding devices to remove the upset metal 77 and 78 as the welded drill pipe and tool joint are turned by the first motor 48. Thus this apparatus makes possible a smooth weld as shown in FIG. 6. Furthermore, such a weld can now be made using a mobile friction welding unit in the field where the drill strings are assembled.

This invention provides many advantages because the heat forming the weld is generated at the point of contact of the workpieces where it is needed and there is no unnecessary heat generated. If the weld cycle is rapid enough, energy is converted to heat only as it is needed to perform the actual weld. This prevents overheating of the workpieces and excessive decarburization and upset. Also slight impurities which may be present in the weld will tend to flow out of the weld zone with the upset while no foreign matter, such as fluxes or bonding materials, need be added. Although the drill pipe 47 has been shown stationary during the welding process, it could be counter-rotated by means of the first motor 48 to increase the relative rotational velocities of the pieces to be welded. In certain applications, counter-rotating pieces, each driven at a high speed and having its own fast braking system, allow a much faster weld cycle with the obvious resulting advantages. Also, small diameter sections of about one inch or less may require excessively high rotational speeds to attain the required surface velocities unless counter-rotation is used.

Although the butt welding of tubular workpieces has been described, solid cylindrical workpieces may be just as easily butt welded as the higher relative velocity of the edges of the workpieces generates heat faster and renders the outer edges plastic before the center is heated. This allows the edges to flow under pressure and to concentrate the force urging the workpieces together at the cooler, unmelted center. This concentration of pressure, along with heat soaking in from the periphery, soon renders the center molten enough for welding. For example, rivets or similar fastening means can be welded in place.

As shown in FIG. 7, the chucks 26 and 29 may be enclosed in a cylindrical casing 80 into which a controlled atmosphere may be introduced through a tube 81. Certain metals, such as magnesium and zirconium, should be friction welded in an inert atmosphere to prevent oxidation and because of the safety hazard of explosion or fire. In other applications, special atmospheres at high pressures may be necessary to prevent or combat excessive decarburization. A preheating, carburizing gas flame may also be used as may induction coils to heat treat a completed weld and prevent a too rapid air quench which is the usual means of cooling and completing the weld.

One great advantage of the friction welding of metals is that dissimilar metals may be joined in a firm weld. Brass and copper can be welded directly to steel and aluminum can be directly welded to brass or steel. Limitations seem to appear in the welding of dissimilar metals when there is an extreme difference in their melting points, heat conductivities and solubilities of the lower melting alloy into the higher melting alloy. FIG. 8 shows how even this difficulty can be overcome. If the workpieces 82 and 83 are rotated in the same or different directions and a thin wafer of material 84 is held stationary and placed between them as they are brought together, a weld such as that shown in FIG. 9 would result. If the workpiece 82 of a lower melting point or heat conductivity were to be welded to a workpiece 83 of a higher melting point or heat conductivity, a wafer 84 with intermediate properties could be used to ensure a firm weld.

FIGS. 10A and 10B show that friction welding is not confined to the butt welding of two cylindrical pieces. A stud 85 is shown welded to a plate 86.

FIG. 11A and FIG. 11B show the edges of the workpieces 85' tapered to fit into a socket or interlocking taper in the second workpiece 86'. This taper can include a number of concentric ridges and corresponding depressions on weld surfaces. In profile this would appear as a saw tooth arrangement. Pieces lock together in alignment and a stronger weld results from the larger welded area of multiple interlocking tapers.

In another embodiment of the invention FIG. 12 shows a conventional round of ammunition in which a projectile 90 is seated in a casing 91 containing an explosive propelling charge 92. The projectile 90 is machined from solid or hollow blanks of steel and a softer rotating band 93 of low carbon steel or brass is swaged onto the projectile. The softer rotating band is cut by the rifling and forms a relatively gas tight seal to confine the propelling gases as it grips the rifling which imparts rotation to the projectile as it travels down the bore.

The conventional swaging operation to secure the rotating band 93 to the projectile 90 requires that the projectile be especially knurled or machined to accept the band. These operations take time and are expensive. If the band is welded in place using conventional welding techniques, the high temperature of the weld puddle can either collapse or deform thin walled projectiles or necessitate subsequent heat treatment to relieve residual stresses. The rough, irregular appearance of conventional welds also requires a final machining of the weld area.

This invention includes making a taper 94 on the projectile as shown in FIG. 13 and forming a special rotating band 95 which has a corresponding inner taper 96. Then the projectile 90 and the rotating band can be rotated relative to each other, as has been described, to give a relative surface speed in excess of 50 feet per second (for example, for AISI 4140 steel). When the band is held against the projectile with sufficient force so that a pressure of over 2000 p.s.i. results in the contact area, a friction weld may be made. The friction welding cycle may be so brief that the upset is small and uniform and requires no further machining. The heat may be so localized and generated for such a brief period of time that the projectile does not deform and no subsequent heat treating is needed. The relative rotation of the parts to be welded in this application of friction welding may be stopped by merely releasing the band 95. FIG. 14 shows the band 95 welded to the projectile in this manner.

FIG. 17 shows an alternate procedure whereby a special circular split clamp 97 may be used to compress a split ring rotating band 98 to apply a normal force between the rotating projectile 90 and the band 98 and thereby eliminate the need to use the tapered geometry. FIG. 18 shows a rotating band 98 modified with an offset split 87 so that it can be welded to a projectile. This method for attaching rotating bands requires no special preparation or modification of the projectiles.

The thin conical windshield 99 shown in FIG. 12 is used to stabilize the projectile 90 during its flight. In current practice this windshield 99 is resistance welded or glued to the projectile 90, but neither method has proved entirely satisfactory or reliable.

As shown in FIG. 13, this invention contemplates rotating the projectile 90 while the windshield 99 is held against it to be friction welded in place as shown in FIG. 14. As the metal at the interface of the windshield 99 and projectile 90 becomes molten and deforms during the welding, it may flow to result in the thinner, weaker portion 88. In those cases where this is found to be troublesome, a thicker inner portion 89, as shown in FIG. 15, may be provided in the weld zone so that, after the deformation of the windshield in welding, its thickness at the weld is as great or greater than the surrounding wall thickness. FIG. 16 shows such a windshield welded in place with the weld area of greater thickness than the wall. In the friction welding of thin walled workpieces such as these windshields, special nesting fixtures may be needed to surround the weld area so that sufficient pressure can be exerted to complete the weld.

Friction welding particularly lends itself to the techniques of automation as many standard instruments can be used to register and control the stages of the welding cycle. Referring to FIG. 1, a simple limit switch 44 can be set to respond to the amount of the upset after the workpieces are first brought into contact with each other. The switch 44 reacts to motion of the spindle yoke 32 to disengage the clutch 39, apply the brake 40 and actuate a hydraulic servo valve to increase the pressure of the cylinder 30 to complete the weld. This is possible because the amount of the upset varies according to the distance the workpieces are forced together. In a like manner, thermoelectric or infra-red signals generated by heat at the weld zone may be used to control the weld cycle. The amount of torque registered at the stationary chuck 26 by torque dynamometers may also be used with most metals to control the weld cycle since the coefficient of friction varies as the metal in the weld zone reaches its melting temperature.

What is claimed is:

1. An apparatus for friction welding metal workpieces comprising, in combination, a frame, a stationary chuck fixed to said frame which supports axial thrust, a movable chuck, means to force said movable chuck towards said stationary chuck, a rigid transverse crosshead support slidably mounted within said frame supporting said movable chuck, means to rotate rapidly one of said chucks as said movable chuck forces a workpiece against the workpiece in said stationary chuck, and means to stop the rotation of said rotating chuck rapidly.

2. The combination according to claim 1 wherein the apparatus includes self-aligning means supporting said stationary chuck for welding workpieces having matching tapers.

3. The combination according to claim 1 which includes means for maintaining a controlled gaseous atmosphere between the chucks.

4. An apparatus for friction welding metal workpieces including a frame, an axially fixed workpiece chuck and an axially movable workpiece chuck mounted on the frame, means to force the movable chuck towards the stationary chuck, means to rotate rapidly at least one of the chucks as the movable chuck forces a workpiece against another workpiece in the other chuck, and means to stop the rotating chuck rapidly, characterized in that the frame is provided with a pair of end members, a shaft of the movable chuck being rotatable and slidable in one end member, a shaft of the stationary chuck being rotatably mounted in the other end member, at least two parallel longitudinal frame members, such as rods, coplanar with the axes of the chucks and fixed between the end members, and a rigid transverse crosshead support slidably mounted on said longitudinal members and supporting the movable chuck.

References Cited in the file of this patent

UNITED STATES PATENTS

| | | |
|---|---|---|
| 463,134 | Bevington | Nov. 17, 1891 |
| 463,617 | Bevington | Nov. 24, 1891 |
| 786,421 | Cutler | Apr. 4, 1905 |
| 1,275,941 | Bauer | Aug. 13, 1918 |
| 1,359,625 | Slick | Nov. 23, 1920 |
| 1,775,311 | Halle | Sept. 9, 1930 |
| 2,047,306 | Brookins et al. | July 14, 1936 |
| 2,338,975 | Schumacher | Jan. 11, 1944 |
| 2,366,272 | Le Tourneau | Jan. 2, 1945 |
| 2,393,883 | Broderson | Jan. 29, 1946 |
| 2,396,108 | Loewy | Mar. 5, 1946 |
| 2,473,306 | Schrieber | June 14, 1949 |
| 2,853,118 | Schnitzius | Sept. 23, 1958 |
| 2,933,428 | Mueller | Apr. 19, 1960 |
| 2,956,611 | Jendrisak | Oct. 18, 1960 |
| 3,062,695 | Hull | Nov. 6, 1962 |

FOREIGN PATENTS

| | | |
|---|---|---|
| 572,789 | Great Britain | Oct. 24, 1945 |